(12) United States Patent
Fukuda et al.

(10) Patent No.: US 10,554,085 B2
(45) Date of Patent: Feb. 4, 2020

(54) ROTATING ELECTRICAL-MACHINE STATOR, AND ROTATING ELECTRICAL MACHINE PROVIDED WITH SAME

(71) Applicant: Hitachi Automotive Systems, Ltd., Hitachinaka-shi, Ibaraki (JP)

(72) Inventors: Tomohiro Fukuda, Hitachinaka (JP); Hisaya Shimizu, Hitachinaka (JP); Shinji Yamazaki, Hitachinaka (JP); Kenichi Nakayama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 358 days.

(21) Appl. No.: 15/320,943

(22) PCT Filed: Jul. 29, 2015

(86) PCT No.: PCT/JP2015/071439
§ 371 (c)(1),
(2) Date: Dec. 21, 2016

(87) PCT Pub. No.: WO2016/021451
PCT Pub. Date: Feb. 11, 2016

(65) Prior Publication Data
US 2017/0133899 A1 May 11, 2017

(30) Foreign Application Priority Data

Aug. 7, 2014 (JP) .................................. 2014-160935

(51) Int. Cl.
*H02K 3/14* (2006.01)
*H02K 1/16* (2006.01)

(52) U.S. Cl.
CPC ................. *H02K 3/14* (2013.01); *H02K 1/16* (2013.01)

(58) Field of Classification Search
CPC ............... H02K 3/14; H02K 1/16; H02K 3/12
See application file for complete search history.

(56) References Cited

U.S. PATENT DOCUMENTS

| 5,714,824 A * | 2/1998 | Couture ................... H02K 3/12 310/179 |
| 2004/0007931 A1 | 1/2004 | Gorohata et al. |

(Continued)

FOREIGN PATENT DOCUMENTS

| CN | 102097874 A | 6/2011 |
| CN | 102812620 A | 12/2012 |

(Continued)

OTHER PUBLICATIONS

International Search Report (PCT/ISA/210) issued in PCT Application No. PCT/JP2015/071439 dated Nov. 2, 2015 with English translation (6 pages).

(Continued)

*Primary Examiner* — Jue Zhang
*Assistant Examiner* — Bart Iliya
(74) *Attorney, Agent, or Firm* — Crowell & Moring LLP

(57) ABSTRACT

Provided are: a rotating-electrical-machine stator in which the height of coil ends of a stator coil is suppressed, while interference between adjacent conductors at the coil ends is avoided; and a rotating electrical machine provided with same. The rotating-electrical-machine stator is provided with: a stator core provided with a plurality of slots; and a stator coil inserted into the slots. The rotating-electrical-machine stator is characterized in that: the stator coil is provided with at least two conductors which are disposed in the same layer as a first conductor, and which are inserted into the slots adjacent to the first conductor; and the shapes of coil protrusions protruding radially outwards are configured so as to form arcs.

5 Claims, 10 Drawing Sheets

(56) References Cited

U.S. PATENT DOCUMENTS

| | | | |
|---|---|---|---|
| 2005/0168094 A1 | 8/2005 | Higashino et al. | |
| 2006/0103255 A1 | 5/2006 | Seguchi et al. | |
| 2006/0163959 A1 | 7/2006 | Ogawa et al. | |
| 2009/0322178 A1 | 12/2009 | Dobashi et al. | |
| 2010/0148621 A1* | 6/2010 | Ishizuka | H02K 3/12 310/201 |
| 2010/0270094 A1* | 10/2010 | Nakayama | H02K 3/12 180/65.7 |
| 2011/0133593 A1 | 6/2011 | Nakamura | |
| 2013/0009509 A1 | 1/2013 | Tsuge et al. | |
| 2013/0187509 A1* | 7/2013 | Nakamura | H02K 3/28 310/184 |
| 2015/0326086 A1* | 11/2015 | Takahashi | H02K 3/12 310/45 |

FOREIGN PATENT DOCUMENTS

| | | |
|---|---|---|
| JP | 2004-32892 A | 1/2004 |
| JP | 2005-218232 A | 8/2005 |
| JP | 2006-149049 A | 6/2006 |
| JP | 2006-211810 A | 8/2006 |
| JP | 2010-11715 A | 1/2010 |
| JP | 2011-72052 | 4/2011 |
| JP | 2011-103755 A | 5/2011 |
| JP | 2011-142798 | 7/2011 |
| JP | 2011-182524 | 9/2011 |
| JP | 2011-234482 A | 11/2011 |
| JP | 2011-259669 A | 12/2011 |

OTHER PUBLICATIONS

Japanese-language Written Opinion (PCT/ISA/237) issued in PCT Application No. PCT/JP2015/071439 dated Nov. 2, 2015 (4 pages).

Japanese-language Office Action issued in counterpart Japanese Application No. 2016-540167 dated Mar. 27, 2018 (six (6) pages).

Chinese-language Office Action issued in counterpart Chinese Application No. 201580041878.2 dated Mar. 5, 2019 with English translation (13 pages).

* cited by examiner

ROTATING ELECTRICAL-MACHINE STATOR, AND ROTATING ELECTRICAL MACHINE PROVIDED WITH SAME

TECHNICAL FIELD

The present invention relates to a stator of a rotating electric machine such as a motor and a generator, and a rotating electric machine including the stator.

BACKGROUND ART

JP 2011-234482 A (PTL 1) discloses a background art of the present technical field. The publication discloses that "there is provided a stator of a rotating electric machine that can reduce damage to an insulation film of a conductor that forms a stator coil while suppressing enlargement of a coil end of the stator coil. A turn portion of the conductor is formed of a protruding portion that protrudes from a first slot in a direction parallel to an axial direction of a stator core, a slope portion that diagonally extends at an angle of less than 90 degrees toward a kth slot (another slot), which is separated from the first slot at a predetermined interval (one magnetic pole pitch) via a first bent portion bent in a circumferential direction from a tip of the protruding portion, and a second bent portion bent in a direction parallel to the axial direction of the stator core from a tip of the slope portion, and connected to a slot housing portion housed in the kth slot. Therefore, the turn portion includes two bent portions, and is formed in an asymmetric shape in a circumferential direction.

CITATION LIST

Patent Literature

PTL 1: JP 2011-234482 A

SUMMARY OF INVENTION

Technical Problem

However, in the technique disclosed in PTL 1, enlargement of a wire diameter of a stator coil causes coils adjacent to each other to easily interfere therewith when shifting from a first slot to a second slot. In order to avoid the interference therebetween, many parts of a conductor need to be bent at the time of slot shift; however, the risk of damaging an insulation film that covers a coil surface increases. Making the insulation film thick as a countermeasure against the above causes a problem of decreasing a space factor of the conductor in the slot and thus, lowering the efficiency. In addition, it becomes difficult to reduce the height of the coil end due to the interference between the adjacent conductors.

Accordingly, an object of the present invention is to provide a stator of a rotating electric machine in which the height of a coil end of a stator coil is reduced while interference between adjacent conductors at the coil end is avoided, and to provide a rotating electric machine including the stator.

Solution to Problem

In order to solve the problem described above, configurations described in claims are adopted, for example.

The present application includes a plurality of methods to solve the problem described above. An example of such methods is a stator of a rotating electric machine, including a stator core that has a plurality of slots, and a stator coil inserted into the slot. In addition, the stator coil includes two or more conductors disposed in the same layer as a first conductor and inserted into the slots adjacent to the first conductor, and a shape of a coil-protruding portion protruding to an outer diameter is an arc-like shape.

Advantageous Effects of Invention

The present invention can provide a stator of a rotating electric machine in which the height of a coil end of a stator coil is reduced while interference between adjacent conductors at the coil end is avoided, and a rotating electric machine including the stator.

Other problems, structures, and effects that are not described above will be apparent from the following description of the embodiment.

DESCRIPTION OF EMBODIMENTS

Hereinafter, an embodiment of the present invention will be described.

In the following description, a rotating electric machine for a hybrid electric vehicle is used as an example of a rotating electric machine. In addition, in the following description, an "axial direction" refers to a direction along a rotation axis of the rotating electric machine. A circumferential direction refers to a direction along a rotation direction of the rotating electric machine. A "radial direction" refers to a radius vector direction (radial direction) when the rotation axis of the rotating electric machine is regarded as a center. An "inner periphery side" refers to an inner side (inner diameter side) in the radial direction, and an "outer periphery side" refers to the opposite direction, that is, an outer side (outer diameter side) in the radial direction.

First, an outline of the embodiment will be described.

The embodiment described herein relates to a coil structure of the stator of the rotating electric machine. The rotating electric machine mainly includes a cylindrical stator, and a rotor disposed on an inner periphery side of the stator at a predetermined distance from the stator.

The stator has a plurality of magnetic poles arranged such that the polarity alternates in a rotation direction, and includes a cylindrical stator core, and a plurality of stator coils wound around the stator core. The stator core includes a plurality of slots that are formed to penetrate the stator core in the axial direct on and arranged circumferentially to accommodate the stator coils. Each stator coil is formed by electrically connecting a number of conductors disposed in the respective slots. The coil extends axially in the slot, while a lead-out line portion led out from one axial end of the slot extends over multiple slots arranged at predetermined circumferential pitches to correspond to the plurality of magnetic poles. The stator coils each include a crank portion that shifts in layer as the coils are separated from each other at predetermined circumferential pitches. The stator coils are configured such that the coils led out from the adjacent slots do not interfere with each other.

In the present embodiment, there is also provided a bent portion that is bent back from the outer side in the radial direction toward the inner side in the radial direction, in addition to the crank portion for layer shift in the plurality of phases of stator coils. The bent portion that is bent back can increase the distance for avoiding interference between the adjacent coils, thus decreasing the axial height of the coils. Therefore, t s possible to reduce the height of the coil ends, and to secure a gap from other devices such as a mission portion.

Next, the embodiment will be described in detail with reference to the drawings.

Figure 1:
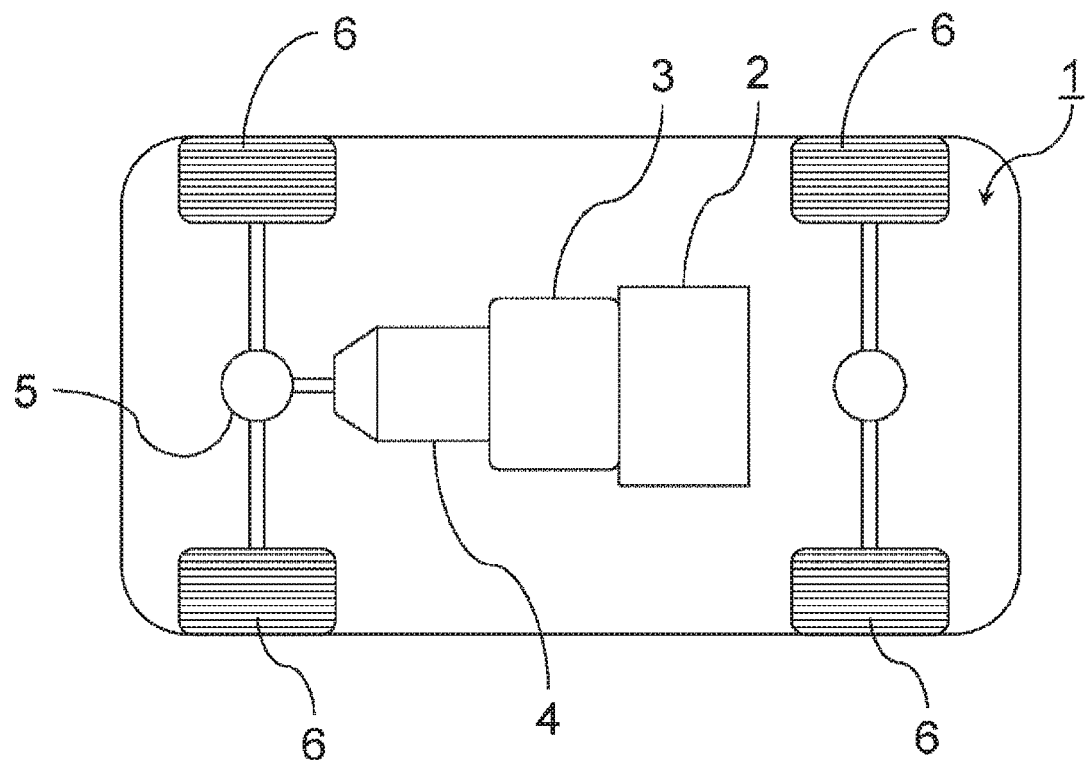
FIG. 1 is a block diagram of a hybrid electric vehicle.

FIG. 1 is a block diagram of a hybrid electric vehicle in which a rotating electric machine according to an embodiment of the present invention is installed. A vehicle 1 includes an engine 2 used as a power source for the vehicle, and a rotating electric machine 3. Alternatively, two rotating electric machines having different functions may be used. In such a case, one of the rotating electric machines performs both power generation and vehicle driving, while the other rotating electric machine performs vehicle driving.

Rotating torque generated by the engine 2 and the rotating electric machine 3 is transmitted to wheels (driving wheels) 6 via a transmission 4, such as a stepless transmission or a stepped automatic transmission, and a differential gear 5. The rotating electric machine 3 is installed between the engine 2 and the transmission 4, or in the transmission 4. Thus, the rotating electric machine 3 needs to have a small size and a high output in order to minimize an influence of space on the vehicle 1.

Figure 2:
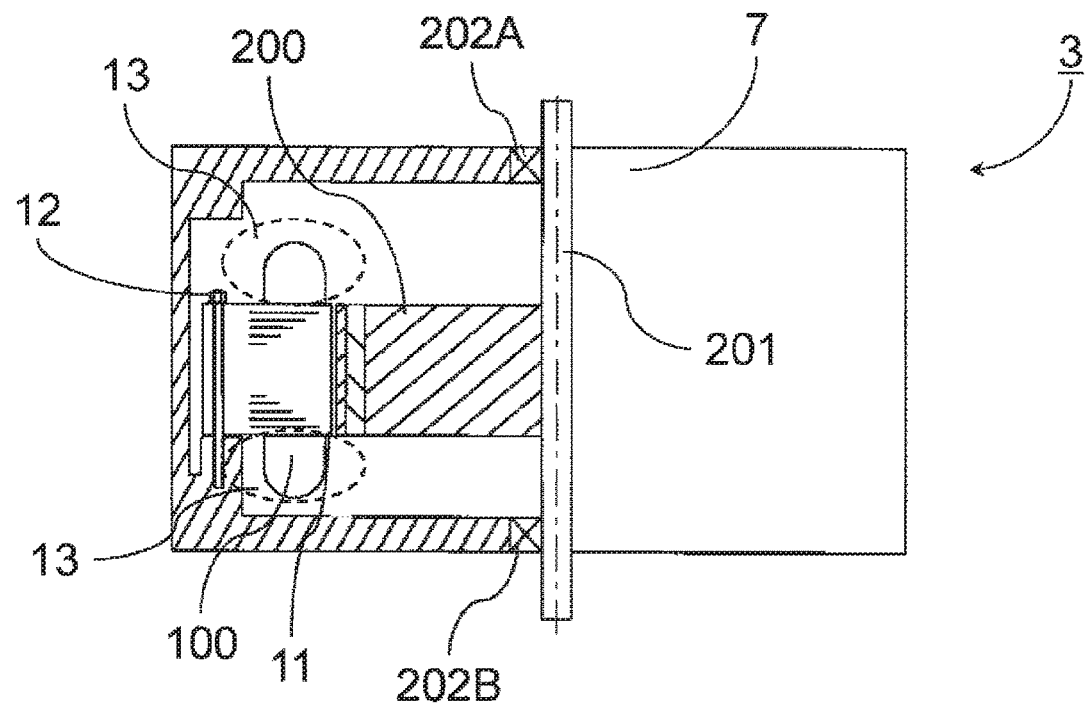
FIG. 2 is a cross-sectional view of a rotating electric machine according to an embodiment of the present invention.

FIG. 2 is a partial cross-sectional view simply illustrating the rotating electric machine 3, in which the left part from a shaft 201 is illustrated as a cross-sectional view and the right part is illustrated as a side view. The rotating electric machine 3 is accommodated and disposed inside a case 7. In a case where the rotating electric machine 3 is disposed between the engine 2 and the transmission 4 as illustrated in FIG. 1, the case 7 is formed using the case of the engine 2 or the case of the transmission 4. In a case where the rotating electric machine 3 is installed inside the transmission 4, the case 7 is formed using the case of the transmission 4.

The rotating electric machine 3 includes a stator 100 and a rotor 200. The rotor 200 is disposed on the inner periphery side of the stator 100 via a gap 11. The rotor 200 is fixed to the shaft 201 and rotates integrally with the shaft 201. Both ends of the shaft 201 are rotatably supported by the case 7 by bearings 202A and 202B. The outer periphery side of the stator 100 is fixed on the inner periphery side of the case 7 with a bolt 12 or the like. The rotating electric machine 3 is a three-phase synchronous electric motor using a permanent magnet as the rotor 200, and functions as an electric motor when a large three-phase alternate current (e.g., about 300 A) is supplied to the stator 100.

Figure 3:
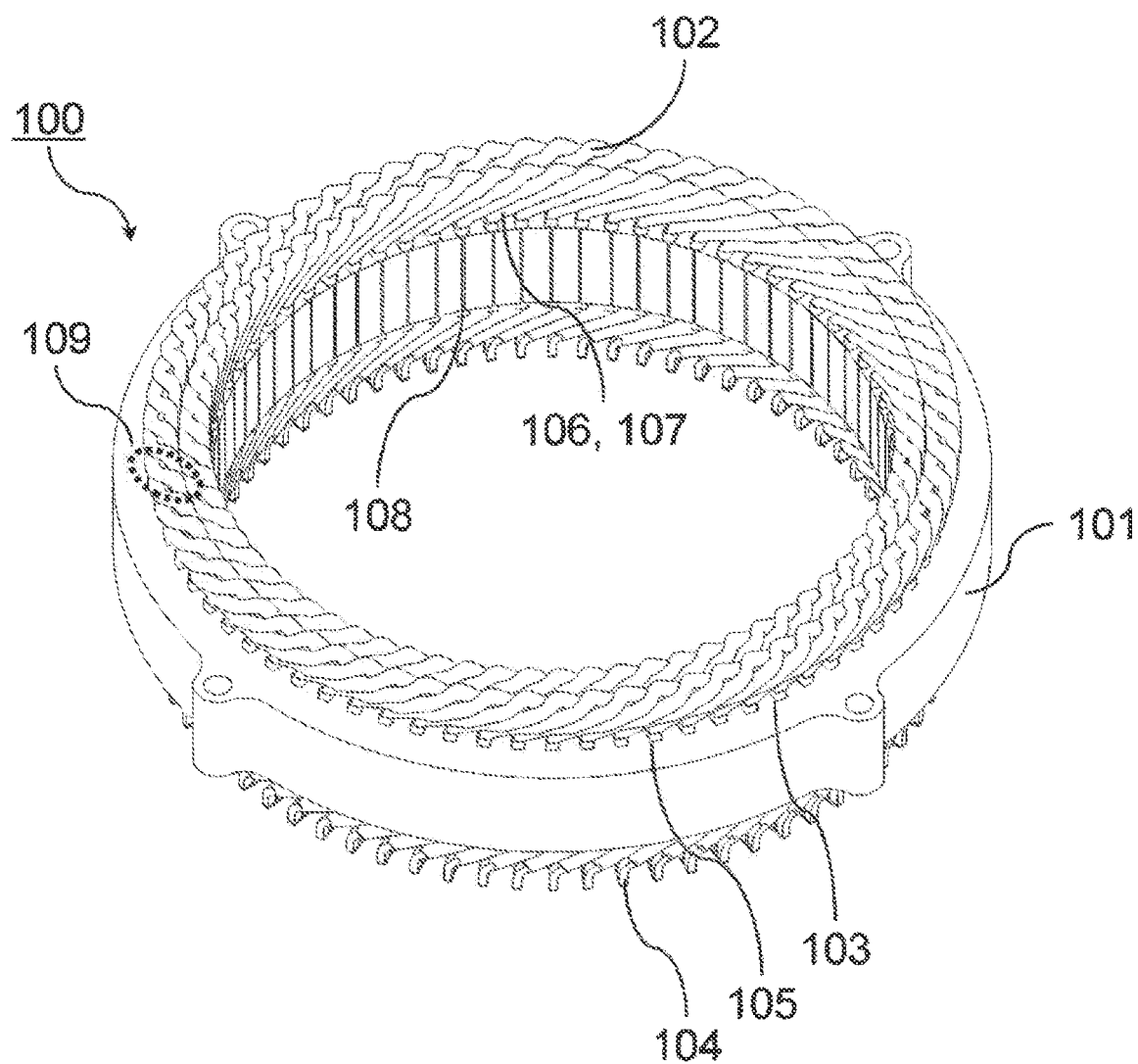
FIG. 3a is an external view of a stator of the rotating electric machine.
Figure 4:
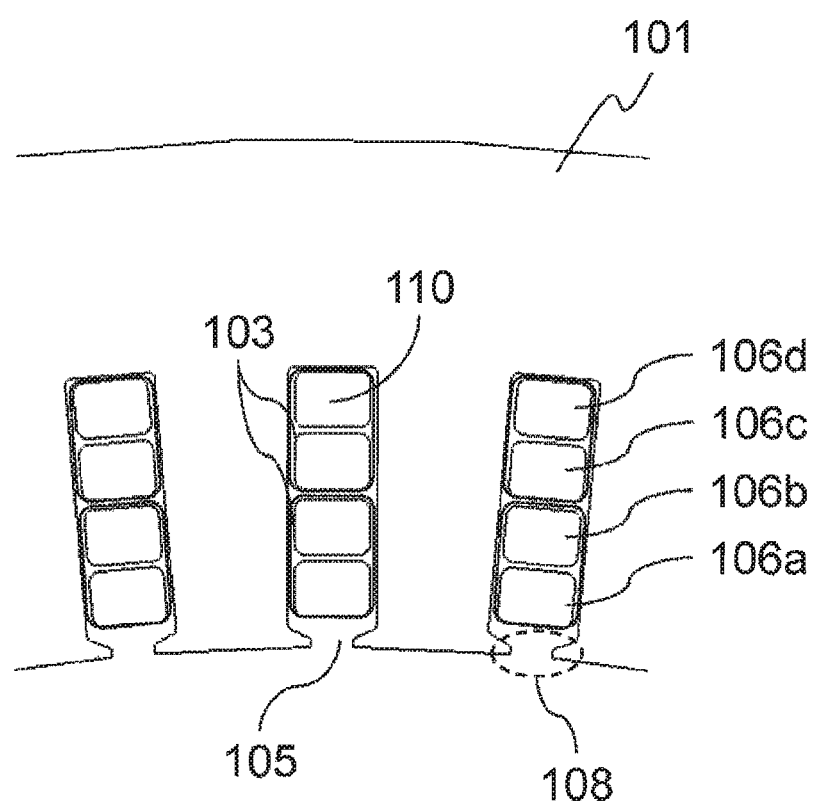
FIG. 4 is a schematic view of a coil inserted into one slot.

FIG. 3 is a perspective view illustrating the stator 100 alone of the rotating electric machine 1. FIG. 4 is a cross-sectional view illustrating the inside of respective slots 105.

As illustrated in FIGS. 3 and 4, the stator 100 includes a stator core (also referred to as a stator iron core) 101 in which a plurality of slots 105 is formed on the inner periphery side of the stator, and three stator coils 102 wound around the stator core 101 and corresponding to U-phase, V-phase, and W-phase, respectively. The slots 105 are formed to pass through in the axial direction and arranged at equal intervals from each other at a predetermined circumferential pitch in the circumferential direction. A slit 108 is opened to extend axially on the inner periphery side.

Each stator coil 102 includes a number of conductors 106 that are inserted into and held in the slots 105, as will be described later. The conductors 106, which are provided adjacent to each other in the same slot 105, are welded together at a welding portion 104 formed at one axial end side (lower end side of FIG. 3) of the stator core 101. Thus, an elongated stator coil 102 in which the conductors 106 are electrically connected to each other at the welding portion 104 is formed. Insulating paper 103 is inserted into each slot 105 to insulate between a linear portion that passes through the slot 105 of the conductor 106 and the stator core 101. As illustrated in FIG. 4, the insulating paper 103 is provided to bundle two adjacent conductors 106 out of the four conductors 106 arranged in each slot 105. That is, two pieces of insulating paper 103 are provided in each slot 105.

Each stator coil 102 extends over multiple slots 105 arranged apart from each other at predetermined circumferential pitches, by a substantially U-shaped or V-shaped lead-out line portion 107 that is led out from one axial end of the slot 105. The plurality of stator coils 102 generates a plurality of magnetic poles whose polarity alternates in the rotation direction.

As illustrated in FIG. 4, the four conductors 106a, 106b, 106c, and 106d inserted into the slot 105 are arranged in a row in the radial direction of the stator core 101 so as to form concentric layers. The positions of the conductors 106a, 106b, 106c, and 106d inserted into the slot 105 are referred to as a first layer, a second layer, a third layer, and a fourth layer respectively, in order from the inner side in the radial direction. That is, the conductor 106a is arranged at and inserted into the first layer, the conductor 106b at the second layer, the conductor 106c at the third layer, and the conductor 106d at the fourth layer.

In the present embodiment illustrated in FIGS. 3 and 4, the stator coil 102 includes a crank portion 109 that is twisted when shifting from the first layer to the second layer, and from the third layer to the fourth layer. Note that this twist in shift between the layers is not essential.

Figure 5:
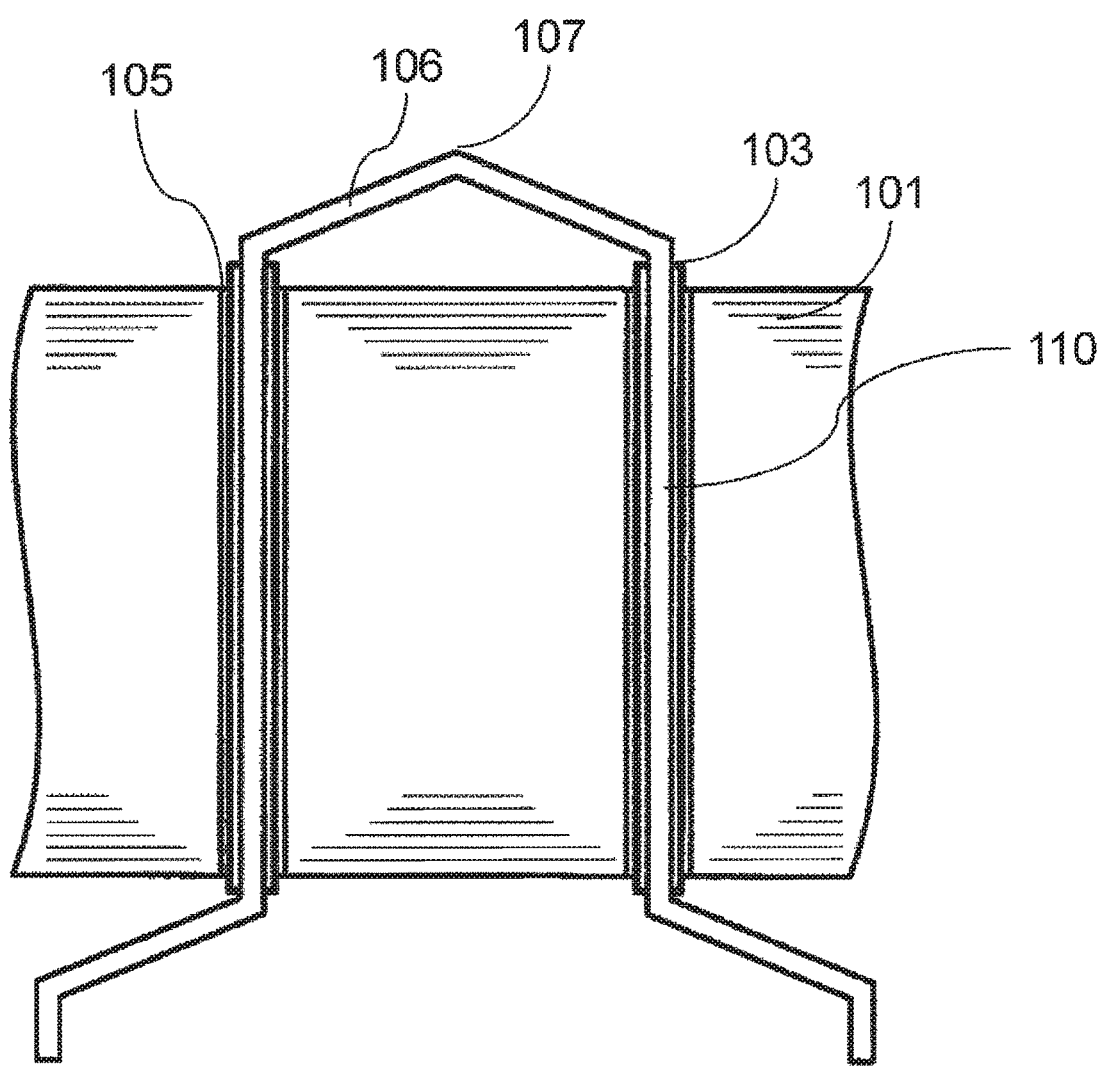
FIG. 5 is a view of a stator core with the coil inserted therein as viewed from the side of an inner diameter.

FIG. 5 is a view illustrating the coil inserted into the stator core, as viewed from the inner diameter side.

Each conductor 106 that constitutes the stator coil 102, as illustrated in FIGS. 4 and 5, is a coil having a rectangular cross-section. Each conductor 106 has a linear portion 110 axially penetrating the slot 105, while one lead-out line portion 107 led out from one axial end (upper end of FIG. 3) of the slot 105 is in the U-shape or the V-shape, and made of a copper wire having joint portions 104 on both ends. A portion of the conductor 106 that is led out from the slot 105 and constitutes the coil end portion is referred to as a coil-end conductor portion 300. A detailed structure of the coil-end conductor portion 300 will be described later.

A segment coil may also be used as the conductor 106. In this case, before the segment coil is inserted into the slot 104, it is possible to form, in advance, coil ends located at both axial ends that are further outside from the ends of the stator core 101, and to easily provide an appropriate insulating distance between different phases or identical phases.

Figure 6:
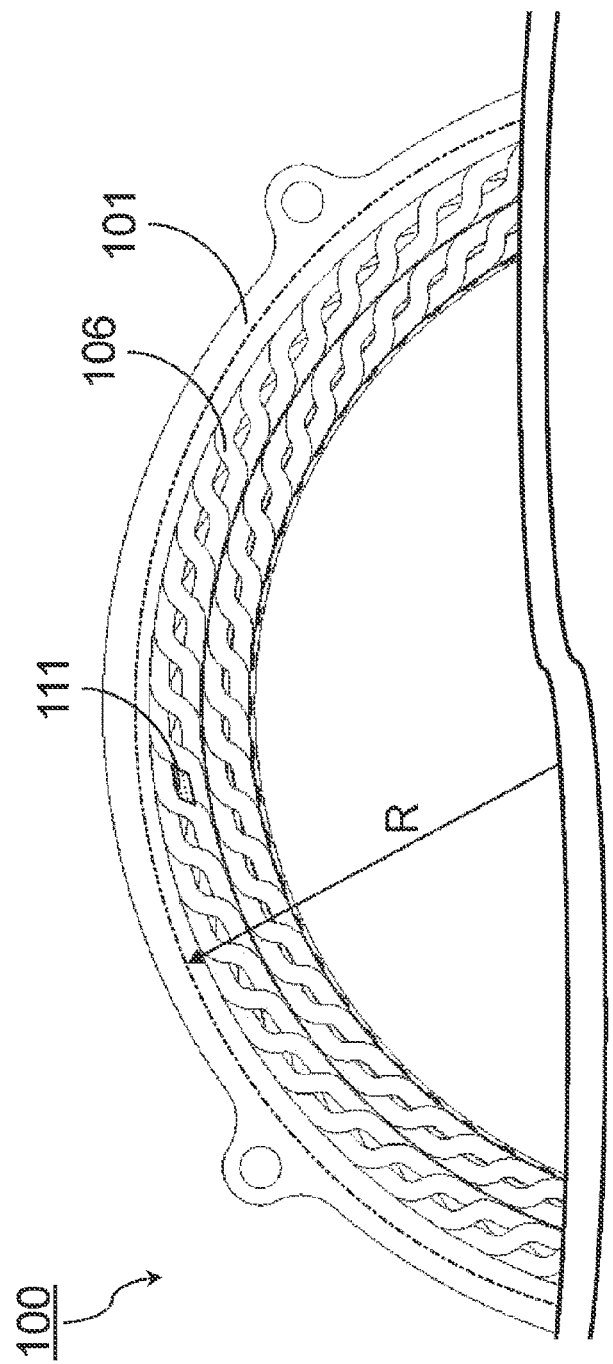
FIG. 6 is an external view of the stator of the rotating electric machine according to the embodiment of the present invention.
Figure 7:
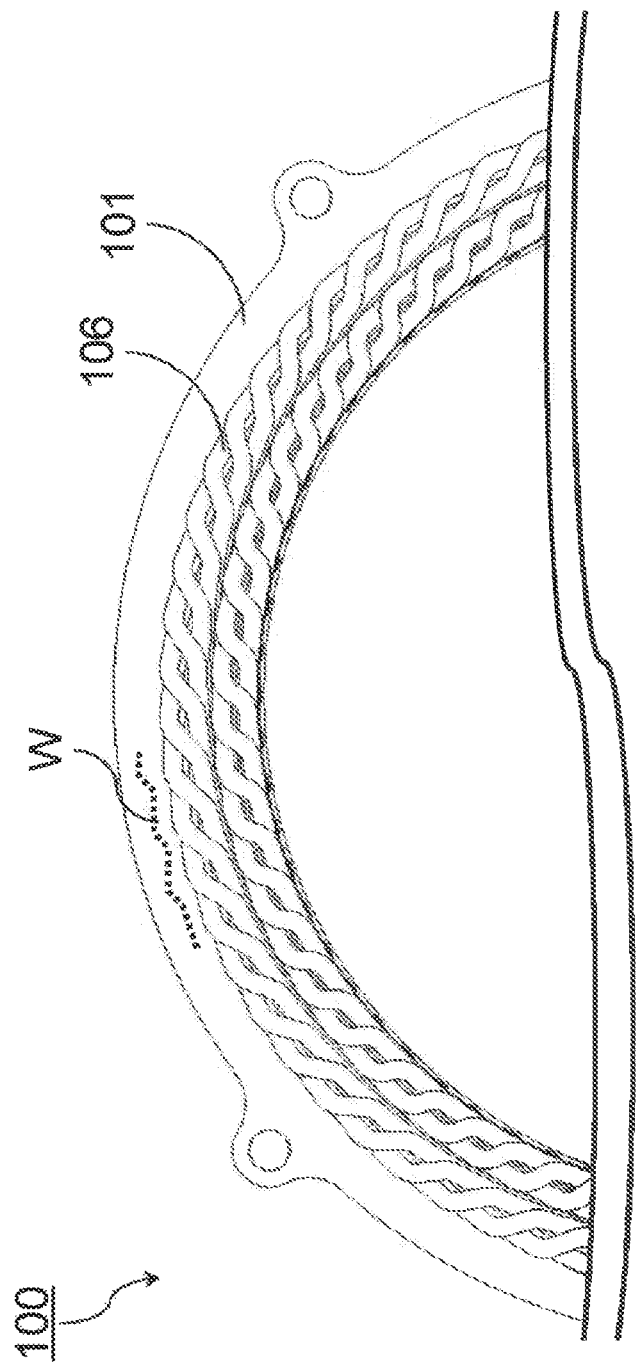
FIG. 7 is an external view of a conventional stator of a rotating electric machine.

FIG. 6 is an external view of the stator of the present embodiment, and FIG. 7 is an external view of the conventional stator.

When the stator 100 is viewed from the axial direction, the conductor 106 is disposed on a circumference having a predetermined radius R. As illustrated in FIG. 6, the outer circumference of the conductor 106 in the present embodiment has a molded shape that traces a smooth arc. As illustrated in FIG. 7, the outer circumference of the conventional conductor 106 has a wavelike molded shape W with respect to the outer diameter line. Furthermore, the conductor 106 is formed such that a gap 111 generated between adjacent crossing conductors has the shape of a parallelogram. As a result, the gap between adjacent conductors can be sufficiently secured even in the case where the wire diameter is large, making it possible to ensure an appropriate insulating distance.

Figure 8:
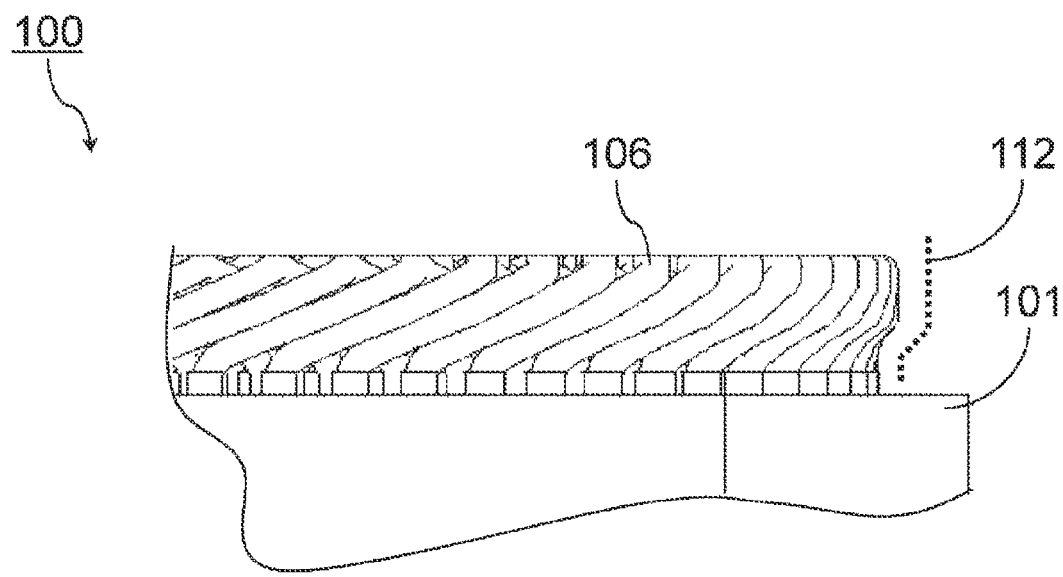
FIG. 8 is a view of the stator of the present embodiment as viewed vertically relative to an axial direction.

FIG. 6 is a view of the stator 100 of the present embodiment as viewed in a direction perpendicular to the axial direction. The conductor 106 led out from the stator core extends in the outer diameter direction (left-right direction n FIG. 8) while forming a substantially trapezoidal shape in parallel with the axial direction (up-down direction in FIG. 8). As a result, it is possible to minimize the protrusion in the outer diameter direction at the coil end portion, and to achieve downsizing and space saving of the rotating electric machine. In order to cool the electric motor, direct cooling by transmission oil, or indirect cooling of the housing assembled outside the stator by the flow of water or air is performed. By providing a flat shape 112 to the coil end in the outer diameter direction, the flow of the cooling member and the cooling effect can be enhanced.

Figure 9:
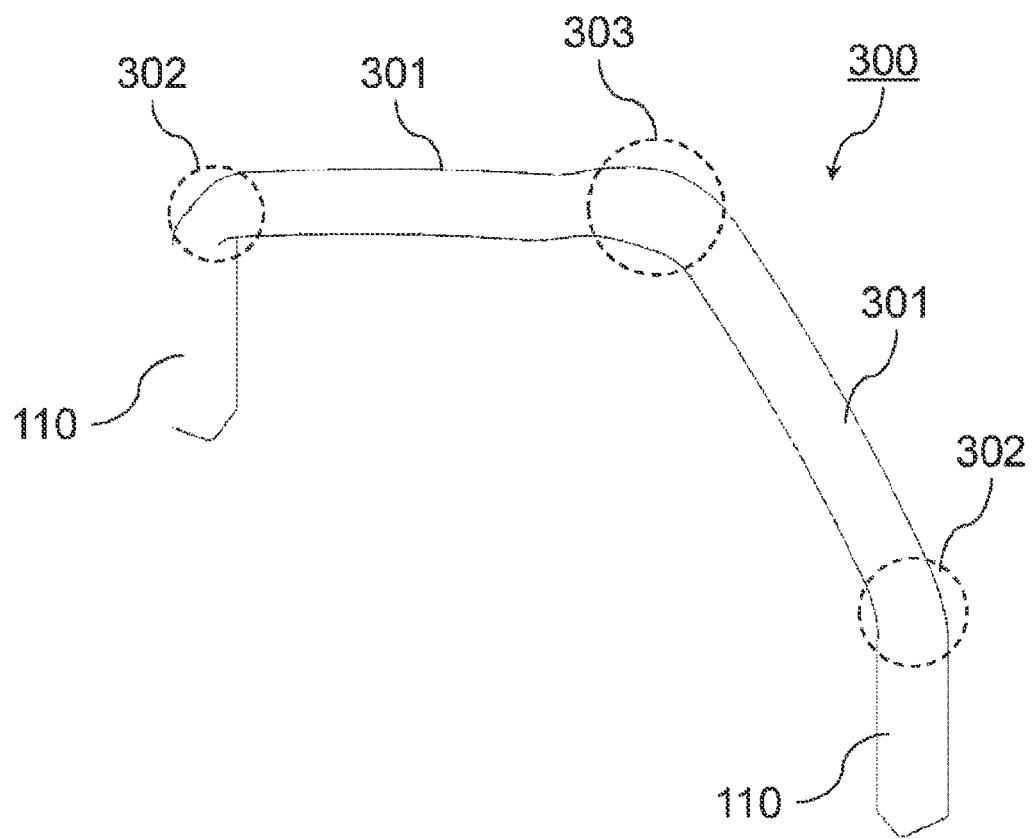
FIG. 9 is a view illustrating a conventional stator coil.
Figure 10:
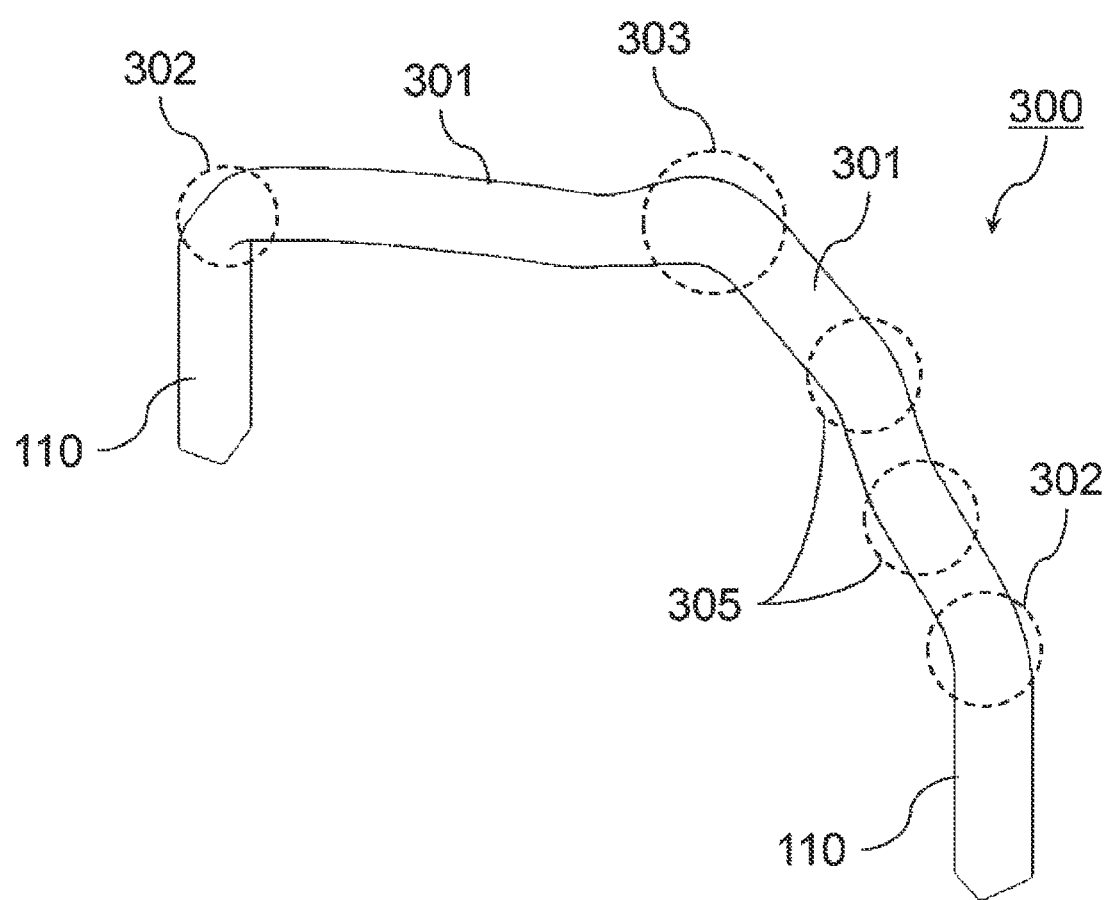
FIG. 10 is a perspective view illustrating the stator coil of the embodiment.
Figure 11:
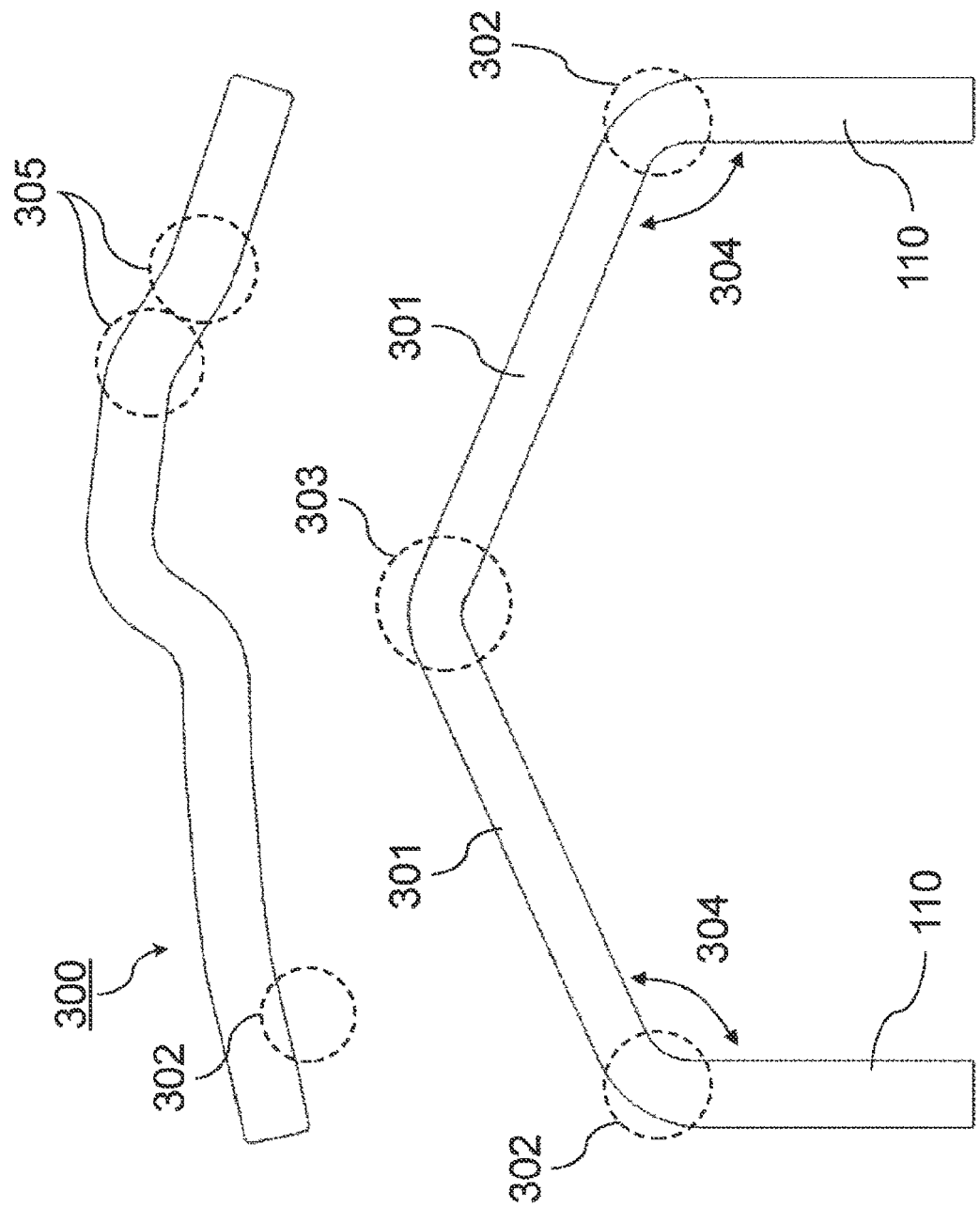
FIG. 11 is a view illustrating the stator coil of the embodiment.
Figure 12:
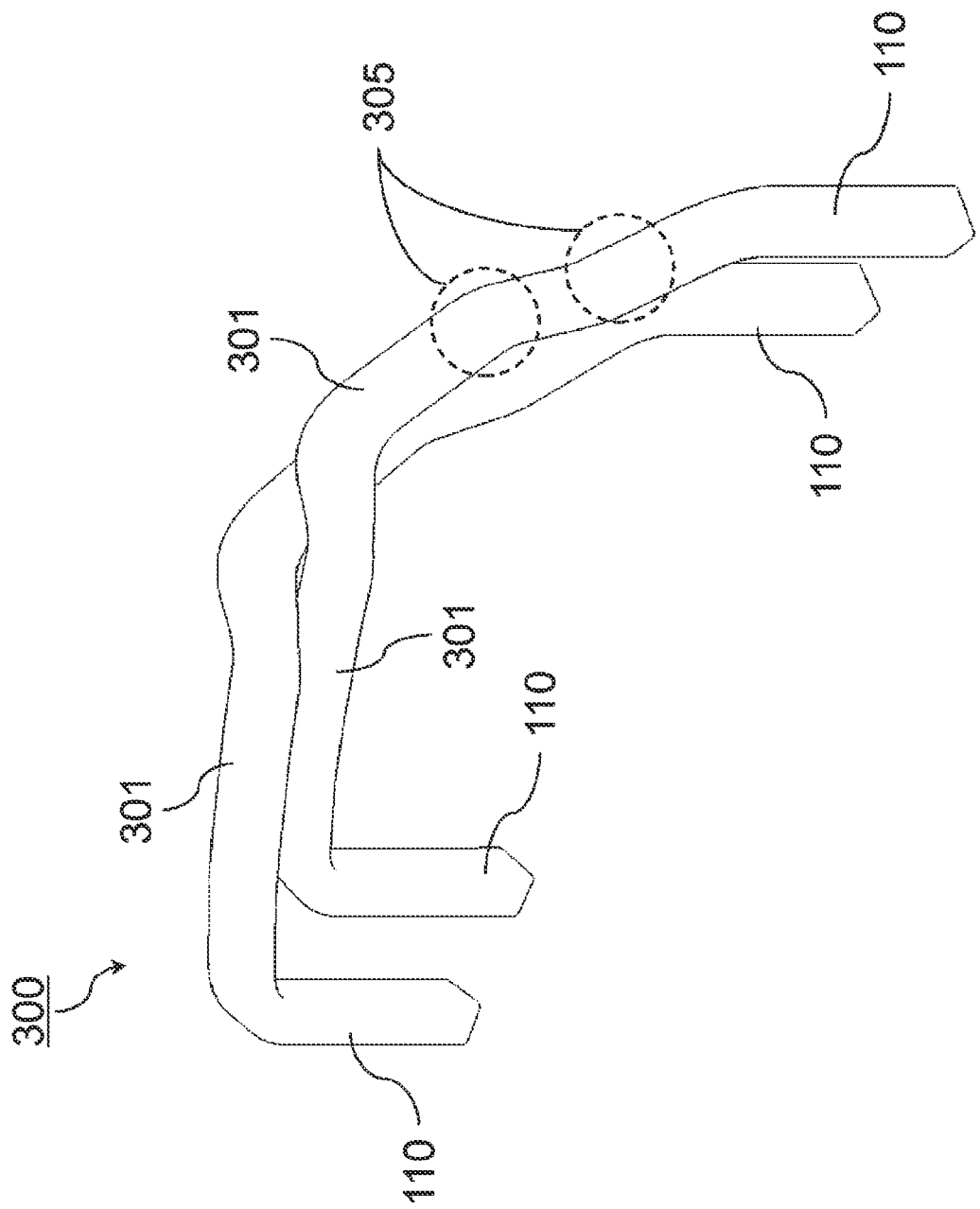
FIG. 12 is a view illustrating a combination of the stator coils of the embodiment.

FIG. 9 illustrates a conventional configuration of the coil-end conductor portion 300 in the conductor 106 constituting the stator coil 102, and FIGS. 10 to 12 are diagrams illustrating the coil-end conductor portion 300 in the present embodiment. As illustrated in FIGS. 9 and 10, each of the coil-end conductor portions 300 includes, at both ends thereof, the linear portions 110 extending in the axial direction from the slot, forms the bent portions 302 connected to respective inclined portions 301 in the axial direction, and forms the crank portion 303 for layer shift at the vertex of the inclined portions. In FIG. 9, the width corresponding to the wire diameter or more does not protrude in the outer diameter direction at a portion from the inclined portion 301 to the crank portion 302. In FIG. 10 illustrating the present embodiment, there are provided the bent portions 305 that bend back from the outer diameter to the inner diameter or from the inner diameter to the outer diameter while shifting in the radial direction by the width corresponding to the wire diameter, at a portion from the inclined portion 301 to the crank portion 303.

As illustrated in FIG. 11, an axial connection angle 304 formed between the linear portion 110 penetrating in the ax direction of the conductor 106 and the inclined portion 301 is the same at both ends when the crank portion 303 is set as the center, and the coil-end conductor portion 300 has a shape with no bent portion in the axial direction from the inclined portion 301 to the crank portion 303 at the vertex of the inclined portion.

As illustrated in FIG. 12, the coil-end conductor portion 300 has the inclined portions 301 varying in axial height, and the radial bent portion 305 provided in the middle of the inclined portion 301 is radially adjacent to the inclined portion 301 of another adjacent coil-end conductor portion 300.

Consequently, while minimizing the protrusion of the coil end portion in the outer diameter direction of the stator core, it is possible to avoid the interference between the adjacent stator coils, which in turn can reduce the height of the coil ends regardless of the wire diameter.

As described above, according to the present invention, the bent portions which are provided in the axial direct on in the segment coil in the stator of the rotating electric machine for a vehicle include one at the vertex and two at slot root portions. At the same time, the bent portions include the first bent portion that is provided and bent in the outer diameter direction of the stator core, and the second or more bent portions that are bent back from the outer diameter direction to the inner diameter direction. With this configuration, it is possible to minimize the protrusion of the coil end portion in the outer diameter direction of the core and to avoid the interference between the adjacent coils. Therefore, it is possible to provide a stator structure of the rotating electric machine, in which the height of the coil ends can be reduced regardless of the wire diameter.

The present invention is not limited to the above-mentioned examples, and includes a variety of modifications. For example, the examples described above have been described in detail in order to describe the present invention for easy understanding, and are not necessarily limited to those including all the configurations described above. In addition, some configurations in the examples can be deleted or replaced by another configuration, or another configuration can be added thereto.

REFERENCE SIGNS LIST 1 vehicle
2 engine
3 rotating electric machine
4 transmission
5 differential gear
6 wheel
7 case
100 stator
101 stator core
102 stator coil
103 insulating paper
104 welding portion of conductor
105 slot
106, 106a-d conductor
107 U-shaped or V-shaped conductor lead-out portion
108 slit portion provided in slot
109 crank portion
110 linear portion of conductor in slot
111 gap generated between crossing conductors
112 flat shape of coil end outer diameter
200 rotor
201 shaft
202A, 202B bearing
300 coil-end conductor portion
301 inclined portion 302 bent portion between inclined portion and linear portion of conductor
303 crank portion for layer shift of stator coil
304 connection angle of bent portion between inclined portion and linear portion of conductor
305 radially bent portion provided in inclined portion

The invention claimed is:

1. A stator of a rotating electric machine, comprising:
a stator core having a plurality of slots;
a stator coil inserted into the slot, wherein the stator coil includes two or more conductors disposed in the same layer as a first conductor and inserted into the slots adjacent to the first conductor, and a shape of a coil-protruding portion protruding to an outer diameter is an arc-like shape; and
between the two slots at a coil end portion of the stator coil, a crank portion that shifts in layer, and a bent portion that bends back from the outer side to the inner side in the radial direction or a bent portion that bends back from the inner side to the outer side in the radial direction, wherein
the stator coil includes:
a first conductor having the bent portion; and
a second conductor disposed in the same layer as the first conductor and inserted into the slot adjacent to the first conductor,
the second conductor passes through the inner side in the radial direction of the bent portion of the first conductor,
the first conductor and the second conductor each include an inclined portion with a varying axial height, and
in the first conductor, the bent portion is disposed in the inclined portion, and the bent portion and the inclined portion of the second conductor are adjacent to each other in the radial direction,
the crank portion that shifts in layer includes a twisted portion,
the stator coil led out from the stator core extends outward in the radial direction, and forms a substantially trapezoidal shape in parallel to the axial direction, and
a first radially bent portion and a second radially bent portion are formed immediately adjacent to one another, and the first radially bent portion is immediately adjacent to the inclined portion and the second radially bent portion is immediately adjacent to the bent portion.

2. The stator of a rotating electric machine according to claim 1,
wherein a cross-sectional shape is a rectangular shape.

3. The stator of a rotating electric machine according to claim 1,
wherein a coil end portion is welded.

4. The stator of a rotating electric machine according to claim 1, being continuously wound around the entire circumference of the stator core.

5. A rotating electric machine comprising the stator of a rotating electric machine according to claim 1.

* * * * *